US009749665B2

(12) United States Patent
Lugeon et al.

(10) Patent No.: US 9,749,665 B2
(45) Date of Patent: Aug. 29, 2017

(54) METHOD AND DEVICE FOR DISTRIBUTING MULTIMEDIA LICENCES WITHIN A DISTRIBUTION SYSTEM OF A SECURED MULTIMEDIA SERVICE

(71) Applicant: NAGRAVISION S.A., Cheseaux-sur-Lausanne (CH)

(72) Inventors: Blaise Lugeon, Chevilly (CH); Yann Bieber, Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 15/033,275

(22) PCT Filed: Oct. 9, 2014

(86) PCT No.: PCT/EP2014/071672
§ 371 (c)(1),
(2) Date: Apr. 29, 2016

(87) PCT Pub. No.: WO2015/062836
PCT Pub. Date: May 7, 2015

(65) Prior Publication Data
US 2016/0286245 A1 Sep. 29, 2016

(30) Foreign Application Priority Data
Nov. 1, 2013 (EP) ..................................... 13191240

(51) Int. Cl.
*H04N 21/23* (2011.01)
*H04N 21/2347* (2011.01)
(Continued)

(52) U.S. Cl.
CPC ..... *H04N 21/2347* (2013.01); *H04N 21/2405* (2013.01); *H04N 21/2541* (2013.01);
(Continued)

(58) Field of Classification Search
None
See application file for complete search history.

(56) References Cited

U.S. PATENT DOCUMENTS

| 2011/0072268 A1 | 3/2011 | Yamagishi et al. |
| 2013/0121489 A1* | 5/2013 | Pestoni ................. H04L 9/0822 380/210 |

FOREIGN PATENT DOCUMENTS

| EP | 2 175 652 | 4/2010 |
| JP | EP 2175652 A1 * | 4/2010 ............. H04N 7/163 |

OTHER PUBLICATIONS

International Search Report and Written Opinion issued in PCT/EP2014/071672 dated Feb. 19, 2015.

* cited by examiner

*Primary Examiner* — Cai Chen
(74) *Attorney, Agent, or Firm* — DLA Piper LLP (US)

(57) ABSTRACT

Method for distributing multimedia licenses by a server to a plurality of user devices in a distribution system of a multimedia service, the access of which is protected by a first protection. This method comprising verifying that computing resources used by the server do not exceed a maximal threshold, if so, generating and then transmitting regular licenses including said first protection in response to user device requests, otherwise switching the server to a singular mode of distribution aiming to protect the access to the multimedia service using a second protection, independent of the first protection; to generate and to transmit to the devices one singular license comprising the second protection; to verify that the computing resources do not exceed the maximal threshold, if so, to switch from the singular mode to a regular mode so as to protect the access to the multimedia content using only said first protection.

11 Claims, 4 Drawing Sheets

(51) Int. Cl.
*H04N 21/24* (2011.01)
*H04N 21/254* (2011.01)
*H04N 21/258* (2011.01)
*H04N 21/266* (2011.01)
*H04N 21/4627* (2011.01)
*H04N 21/643* (2011.01)

(52) U.S. Cl.
CPC . *H04N 21/25816* (2013.01); *H04N 21/26613* (2013.01); *H04N 21/4627* (2013.01); *H04N 21/64322* (2013.01)

METHOD AND DEVICE FOR DISTRIBUTING MULTIMEDIA LICENCES WITHIN A DISTRIBUTION SYSTEM OF A SECURED MULTIMEDIA SERVICE

CROSS REFERENCE TO RELATED APPLICATIONS

This application is a U.S. National Stage Application of International Application No. PCT/EP2014/071672 filed Oct. 9, 2014, which claims priority from European Patent Application No. 13191240.4 filed Nov. 1, 2013.

TECHNICAL FIELD

This invention belongs to the field of digital rights management (DRM) and finds an application in the broadcast of multimedia services such as Pay-TV. Such a service is typically distributed via a signal of broadcast, multicast or unicast type, for example according to the DVB (Digital Video Broadcasting) standard, or it is made accessible through other communication means such as the Internet, according to an IP-type protocol, in particular IPTV (Internet Protocol Television).

Digital rights management applies to any service the access to which is restricted to certain users, in particular to the users having acquired the necessary rights to use this service. In the environment of Pay-TV, which preferably relates to the present invention, this service is materialized by content, such as a program, a debate, a sports event, a cinematographic series or a film. The user can benefit from the access to this content if they are included among the beneficiaries. The access to these services generally being subject to payment, it is secured, for example by an encryption operation which will scramble the content of the service making it unintelligible, or by a password acting as a barrier behind which the content of the service can be under an unscrambled form. In both cases, the unscrambled access to this content can be authorized to any user having requested it by issuing a licence which allows this user to acquire the necessary rights (cryptographic keys, password and/or other access rights) for decrypting or unlocking the protected content.

These licences can be based on the principle of subscription or single purchase. They may thus be respectively for a long duration (for example licence of annual or monthly type) or they can be issued for a short period, typically for the duration of a precise event. This invention is intended to solve a problem occurring in the latter case. It concerns the issuance of licences, i.e. rights or means allowing the user to access an encrypted content, which cover more particularly a precise event of the pay per event type, better known as "Pay-Per-View" (PPV).

PRIOR ART

In a digital pay television system broadcast, for example according to the DVB standard, the multimedia service, in particular the multimedia content (cinematographic events, sports events, entertainment, information, debates, etc.) is in the form of a digital flow. This is broadcast from a server, head-end or management centre, to receivers or user devices adapted to receive and process such a flow. Typically, such reception units can be decoders (Set-Top-Box), computers, tablets, smartphones, etc. This flow is encrypted (i.e. encoded) so that its use may be controlled and the necessary conditions to its use may be defined. This encryption is achieved through control words (CW) that are changed at regular intervals (typically from 1 to 30 seconds) in order to deter any hacker from trying and finding such a control word to decrypt the flow.

For the user device to be able to decrypt the flow encrypted by these control words, the latter are sent in parallel in control messages (ECM), which are themselves encrypted by a key called transmission key. This key is specific to the transmission system (or distribution system) established between the server and the user device, more precisely between the server and a security module of the user device. Indeed, at the user, the security operations are generally carried out in a security module associated to the multimedia unit, i.e. to the user's receiver/decoder. Such a security module can be realized in particular according to four different embodiments. One of them is a microprocessor card, a smart card, or more generally an electronic module (having the form of a key, a badge . . . ). Such a module is generally removable, connectable to the receiver and considered tamper-proof. The form with electric contacts is used the most, but does not exclude a contactless link, for example of the ISO 15443 type.

A second known embodiment is that of an integrated circuit housing, generally placed in a definitive and non removable way in the housing of the receiver. A variant consists of a circuit mounted on a base or connector such as a SIM module connector.

In a third embodiment, the security module is integrated into an integrated circuit housing also having another function, for instance in a descrambling module of the decoder or the microprocessor of the decoder.

In a fourth embodiment, the security module is not realized as hardware, but its function is implemented in the form of software only.

Although the security level differs among these cases, the function is identical in itself so that we may talk of security module irrespectively of the embodiment of this module. In the four embodiments described above, the security module has program executing means (CPU) stored in its memory. This program allows to carry out security operations, verifying the rights, carrying out decryptions, activating a module to carry out cryptographic operations, etc.

An entitlement control message (ECM) does not only contain the control word (CW) but also the conditions for that word to be sent back by the security module to the user's receiver/decoder. During the decryption of control words, the security unit firstly verifies whether a right associated to the access conditions stated in the entitlement control message (ECM) is present in the security unit. This operation thus aims at controlling if the access right to the considered flow is present at the user's place. The control word (CW) is returned to the decoder only if the comparison gives a positive response.

For the access right to be present in the security unit, it has to be charged by an entitlement management message (EMM) that, for security reasons, is generally encrypted by a different key, called right key (RK).

In the following description, in particular regarding the units involved in a distribution system of a secure access multimedia service, a user device will refer to the ensemble comprising the security unit and the users receiver/decoder. Also, the server will simply refer to an entity which may combine several generally different entities. Among these entities, a broadcast centre of multimedia content or a centre giving access to this content or to a multimedia service, an authority or management centre of rights (incl. keys, licences, authentications, etc.) assigned to the users and an encryption centre of the content or its access will be particularly mentioned.

In the case for example of a digital pay television system broadcast according to an IPTV protocol, ECMs, EMMs messages or even control words CWs will not be specifically mentioned. However, the fact remains that the multimedia service remains protected against free access, for example by encryption of the multimedia content. By requiring a licence, the user device can obtain the necessary means for having access to this content. There are different models to obtain licences, among which the models known as "Post-Delivery" (On-Demand Delivery) and "Pre-Delivery" are mentioned. In the first case, content is firstly downloaded or introduced into the user device and the licence is issued as content has to be played, i.e. upon request of the user device if the latter does not yet have the necessary keys for the decryption of this content. The second case is more adapted to a context proposing a broadcast of live content (Live Streaming). This content is broadcast to user devices which already have a subscribed licence for this content.

Whether the broadcast takes place in accordance to an IP protocol (in particular IPTV) according to either of these models or whether it takes place according to another broadcast standard such as DVB, ATSC (Advanced Television Systems Committee) or the Japanese ISDB (Integrated Digital Services Broadcasting) standard, it can engender a problem occurring more particularly during the broadcast of large audience precise events. Indeed, during the broadcast of a sporting competition, a television debate or for example a highly awaited film, a large number of users suddenly wish to acquire a licence necessary for the decryption of the protected content. This peak of requests generally occurs just before the beginning of the broadcast of the concerned event.

The broadcast of the encrypted content, the connection of a large number of users or the transport of control messages including rights, keys or licences, do not generate any real performance problems at the server level, however it is not the same for licences creation, in particular personal licences each dedicated for only one user device. Indeed, the generation of a single personal licence requires a certain number of cryptographic operations. If such licences have to be issued to a large number of user devices, the repetition of these operations overall requires important, computer resources particularly costly in terms of computing power. Now, these operations have to be supported by the server since it constitutes, in such a broadcast system, the device that issues and manages the licences attributed to users.

These licences are specific and unique, that is they are all different from each other and each user has a personal licence that is associated only to the hardware (decoder) of this user. By this means, the sharing of licences with other unauthorized users is avoided.

When the computer resources (CPU resources) of the server are not entirely used, licence generation according to this scheme does not cause any problem. On the other hand, if the request for licences is as strong as to exceed the computing power of the server, the server will no longer be able to respond in time to these requests. Consequently, part of the users will receive their licence only late and will be thus denied the (unscrambled) access to the content until the situation is normalized.

In order to solve this problem, a means could be to provide the server with oversized computing resources or to multiply available servers. However, such a solution would not be certainly well suited to face occasional problems, since it would be expensive and would need to modify the existing equipment by replacing an important part of the existing hardware with more efficient hardware. Another solution would be to take advantage of a computing power provided by a set of network-connected hardware (better known as cloud computing). However, sharing sensitive information (required during the creation of personal licences) among a plurality of independent centres causes other problems, for example security problems.

Moreover, in the case of a DVB type broadcast, the server can, on its own initiative, send messages to user devices at any time, but it does not generally happen this way in the case of a broadcast according to the IP protocol. According to this protocol, and with the exception of particular IP services such as instant messaging services, only the user device can take the initiative to contact a server to exchange messages. If during a relatively restricted time interval, the user device has not obtained any answer from the queried server, then the session (connection) that had been opened by the user device to transmit the request is automatically closed by the latter. Now, in case the server no longer has the computing resources needed to transmit regular licences in response to certain requests coming from user devices, then these devices will automatically close their session at the end of a relatively short waiting time imposed by the protocol. Licence distribution in an IP type environment thus causes a second problem that is communicating to each user device that is still without response from the server, the moment from which this server should be able to meet the request coming from the user device by transmitting the requested regular licence to it.

BRIEF DESCRIPTION OF THE INVENTION

This invention aims at solving, at least in part, the abovementioned problems by proposing an advantageous solution which, without involving significant modifications to the server, allows all user devices requiring a licence to be entitled instantly at any time. This solution is particularly advantageous to deal with high concentrations of licence requests (peak of requests) occurring occasionally and during a relatively short time period, mainly for Pay-Per-View type, or even Video-On-Demand (VOD) type services.

In order to do this, the invention suggests a distribution method of multimedia licences by a server to a plurality of user devices in a distribution system of a multimedia service, the access of which is protected by a first protection according to a regular mode of distribution implemented by the server.

The server is provided with computing resources that allow, at an instantaneous pace proportional to the computing resources used and up to the limit of a maximum pace defined by a maximum use of these resources, to generate regular licences in response to requests coming from user devices.

Each regular licence includes the first protection, the access of which is secured by a personal protection which is associated to each user device and which is different for each of them.

The method includes the following circular steps:
  verifying if said instantaneous pace is lower than the maximum pace and, if so, generating and then transmitting said regular licences to the user devices in response to each of said requests, otherwise switching the server to a singular mode of distribution adapted to distribute as many (regular/singular) multimedia licences as necessary and comprising:

protecting the access to the multimedia service by at least one second additional protection (i.e. in addition to the first protection), independent of said first protection, generating at the server at least one singular licence comprising the second protection, transmitting the singular licence to at least one part of the user devices, verifying, in a repetitive way, if the instantaneous pace is lower than the maximum pace and, if so, switching from singular mode to regular mode to allow access to multimedia service only by means of a regular licence.

Thus, instead of delivering only unique and personal licences (called hereinafter regular licences), this invention suggests, during a period with too many requests, the granting of at least one singular (or global) licence shared among at least one part of the users that cannot immediately be assigned a regular licence. Unlike the regular licence, the singular licence is not specific or unique to each user but it is common to a plurality of users, for example, to all the users that cannot obtain any regular licence in response to their request or to a part of these users.

This licence is singular in two aspects: on the one hand, it can be simplified and/or common to a plurality of users, and on the other hand, it is transitory because it can be only used for a short term (preferably, a very short term) during a transition period. The duration of this period will be limited to the time required by the server to be able to absorb the peak of licence requests and thus to be able again to provide a regular licence directly to all of the requests from user devices.

Advantageously, by using a singular licence in such a method, it becomes possible to save server computing resources by reducing the computing power required to satisfy the requests for licences, especially in case of peaks of requests from user devices. Indeed, in a first embodiment, the singular licence could be a simplified licence that would require significantly lower computing resources to be generated if compared to a regular licence. Such a licence could be obtained by a simplified algorithm that uses lower computing resources. The number of singular licences could, in this case, be identical to the number of regular licences to be transmitted. This would be a first measure to accelerate the production pace (flow) of the licences while maintaining an interesting security level, given the fact that the singular licence is only used for a transitory period.

In another embodiment, the singular licence can be a licence shared among a plurality of user devices. It can be shared by a group of user devices waiting for a regular licence. If, for example, this group includes about 10,000 devices, the calculation of a single singular licence would be enough to replace 10,000 times the same operation. As an alternative, a single singular licence could be calculated for all the user devices, which, due to a lack of power of the server, would be waiting to receive their regular licence. The advantage of such a singular licence is thus the fact that it is calculated only once for a large number of users, or even for all the users that could not receive their regular licence in time. By this means, the server computing resources can be relieved and the server will be able to respond immediately to all the requests from the users by giving them a regular licence, within the limits of possible server computing resources, or a singular licence if this limit is exceeded by too high a concentration of requests.

According to a preferred embodiment, switching from the singular mode to the regular mode is temporized, so that this switching occurs with enough delay time in order to allow user devices to still momentarily access the content by means of the singular licence until they receive and are able to use their regular licence.

Other advantages and embodiments will be also presented in the following detailed description.

BRIEF DESCRIPTION OF THE DRAWINGS

The invention will be better understood thanks to the annexed schematic drawings, given by way of non-limiting examples and in which:

FIG. 3b is a graphic that, in correspondence with the one of FIG. 3a and on the same time base, represents the number of regular and singular licences to be issued by the server to answer the requests shown in FIG. 3a.

FIG. 4b gives, in correspondence with the graphic of FIG. 4a, the probability that user devices have to obtain a regular licence in response to their request during a time interval encompassing the peaks of requests illustrated in FIG. 3a.

DESCRIPTION OF THE INVENTION

Figure 1:
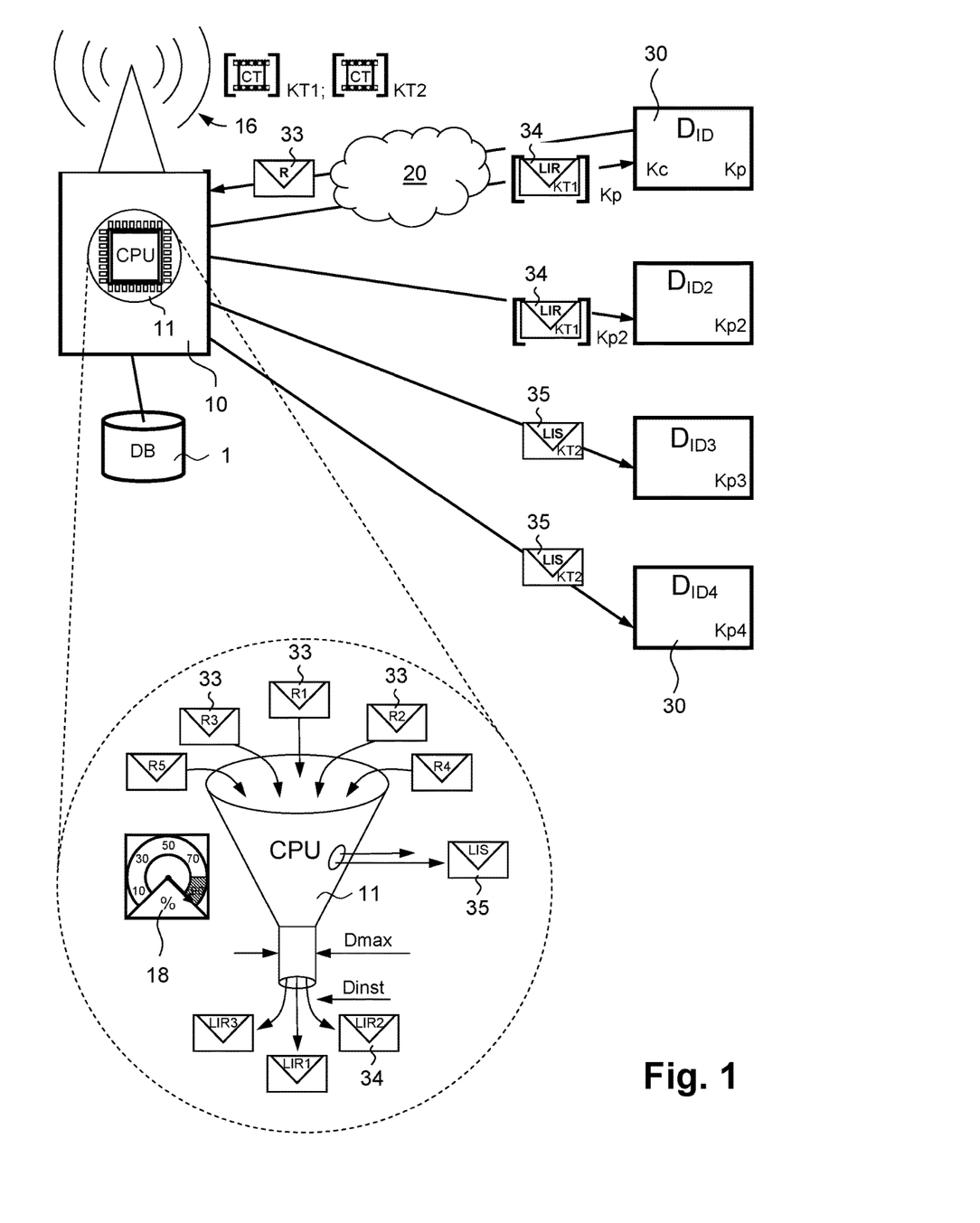
FIG. 1 shows an overall view of a distribution system of licences and multimedia services in which the method of the present invention can be implemented.

Referring to FIG. 1, in a very schematic way it represents a distribution system of licences and multimedia services allowing the implementation of the method of the present invention. In the continuation of the present description, we will more generally talk about multimedia content CT as one of the possible multimedia services proposed by the distribution system. This multimedia content CT is shown in this figure in the form of a cinematographic film portion. In a simplified way, the distribution system integrates mainly a server 10 connected by a transmission means 20 to a plurality of user devices 30. Four user devices 30 have been represented in a non-limiting way in FIG. 1. For the sake of simplicity, only the main differences between the first user device ($D_{ID}$) and each of the other three user devices ($D_{ID2}$, $D_{ID3}$, $D_{ID4}$) have been represented for these last three devices. Each user device is detectable by a unique identifier ID that is specific to it and that is therefore different from other identifiers. Generically, the first user device can be identified by its identifier ID, the second user device carries the identifier ID2, the third ID3 and so on.

Schematized by a single entity, the server 10 can nevertheless include several distinct entities such as a broadcast centre (broadcaster, head-end) or access centre to multimedia content, an authority or centre for management of the rights (allocated to users/customers/subscribers), an encryption centre and/or a management centre of the cryptographic keys related to data encryption (content, control words, control messages or management message), or even other units or subunits managing for example data authentication.

Content CT can come from a multimedia content provider or a database 1 that can be external to the server 10 (for example located at a content CT provider) or be internal to the server 10. This content CT can be typically transmitted in the form of a data transport stream, for example an MPEG-type stream allowing the multiplexing of audio/video stream and description stream of programs and services.

The transmission means 20 can comprise a wire transmission or a wireless communication implemented by a transmission unit 16. This can be for example a satellite or terrestrial radio transmission, a wired transmission, of IP type (Internet) or phone type, etc.

The receiving device 30 can be any type of device capable of receiving multimedia content from the server 10 via transmission means 20. Thus, the receiving device 30 can be a computer, a tablet, a telephone or any other so-called smart device or again preferably a receiver/decoder of the Set-Top-Box (STB) type, which can also be coupled to a device capable of rendering multimedia content, such as for example a monitor, a television, an audio device or any other multimedia equipment such as a game console.

Access to multimedia content CT is protected by a first protection KT1 according to a so-called regular mode of distribution, implemented by the server. Preferably, the first protection KT1 corresponds to a first transmission key generated by the server. Content protected this way is indicated $[CT]_{KT1}$ in the attached figures. By this indication, it will be understood that it is the access to content CT that is protected. In a possible embodiment, the content could be directly encrypted by the first transmission key KT1 but, preferably, the latter is commonly used to encrypt a control word CW, more precisely at least one control word CW. The latter then corresponds to the key that allows to decrypt the encrypted content CT. The cryptogram, indicated $[CW]_{KT1}$ and made of the control word CW encrypted by the first transmission key KT1, is typically transmitted in the data transport stream coming from server 10, in parallel to the encrypted content and more particularly within a first control message ECM1 so that we may adopt the following notation: $ECM1=[CW]_{KT1}$.

The server 10 is equipped with computing resources 11 which are schematized in FIG. 1 by a microprocessor (CPU). These resources are essentially, or even exclusively, dedicated to licence generation in response to requests 33 coming from user devices 30. In the regular mode of distribution, these licences are exclusively licences called regular licences, indicated LIR and found by the reference number 34. Each regular licence LIR includes the first protection KT1, the access of which is secured by a specific (personal) protection Kp that is associated to each user device and that is different for each of these devices. The specific protection Kp is typically a personal key belonging to a unique user device, that is why in FIG. 1, the key indicated Kp2 is associated to the user device identified by identifier ID2, the key indicated Kp3 to the one carrying identifier ID3, and so on. In an asymmetrical cryptographic scheme, the personal key Kp could be the public key specific to the user device in question. In an asymmetrical cryptographic scheme, this personal key Kp (private key) will only be known by the server and the concerned user device. Access to the regular licence LIR can be protected by encrypting the regular licence with Kp or by encrypting the content of this regular licence, i.e. the first protection KT1, by means of the personal protection Kp.

The lower part of FIG. 1 shows, in the form of a schematic funnel, the capacity of computing resources 11 of server 10. The latter can accept a large number of requests 33 coming from user devices 30. Each request 33 is represented in this figure by an identified envelope (R1, R2, R3, R4, etc.) which allows to know the identifier of the user device that has issued it. As an example, the request R2 would be the one emitted by the user device 30 carrying identifier ID2. Since the creation of regular licences LIR requires important computing resources, it may happen that the server is no longer able to respond instantly to all requests 33 it receives from the user devices. This is schematized by the funnel shape given to the CPU, whose output rate is limited by a certain diameter which can only authorize a maximum flow Dmax. This flow or maximum pace of regular licence production is physically defined by the server computing resources or defined by the designer or the manager of the system which, on purpose, wants to attribute a certain maximum computing power of their choice to the server, for example to preserve a part of the resources which would be reserved for other activities.

The instantaneous pace (indicated Dinst in FIG. 1 with reference to the instantaneous flow of regular licences produced by the server) will therefore depend on the number of requests 33 that the server must process. This instantaneous pace can then vary from a lower value of zero to a higher limit value which corresponds to the maximum pace Dmax. In this relation, the instantaneous pace Dinst can be considered as a value proportional to the computing resources used by the server. The usage rate of computing resources by the server is schematized in FIG. 1 by the needle of a measuring unit 18 graduated here in percentage.

Figure 2:
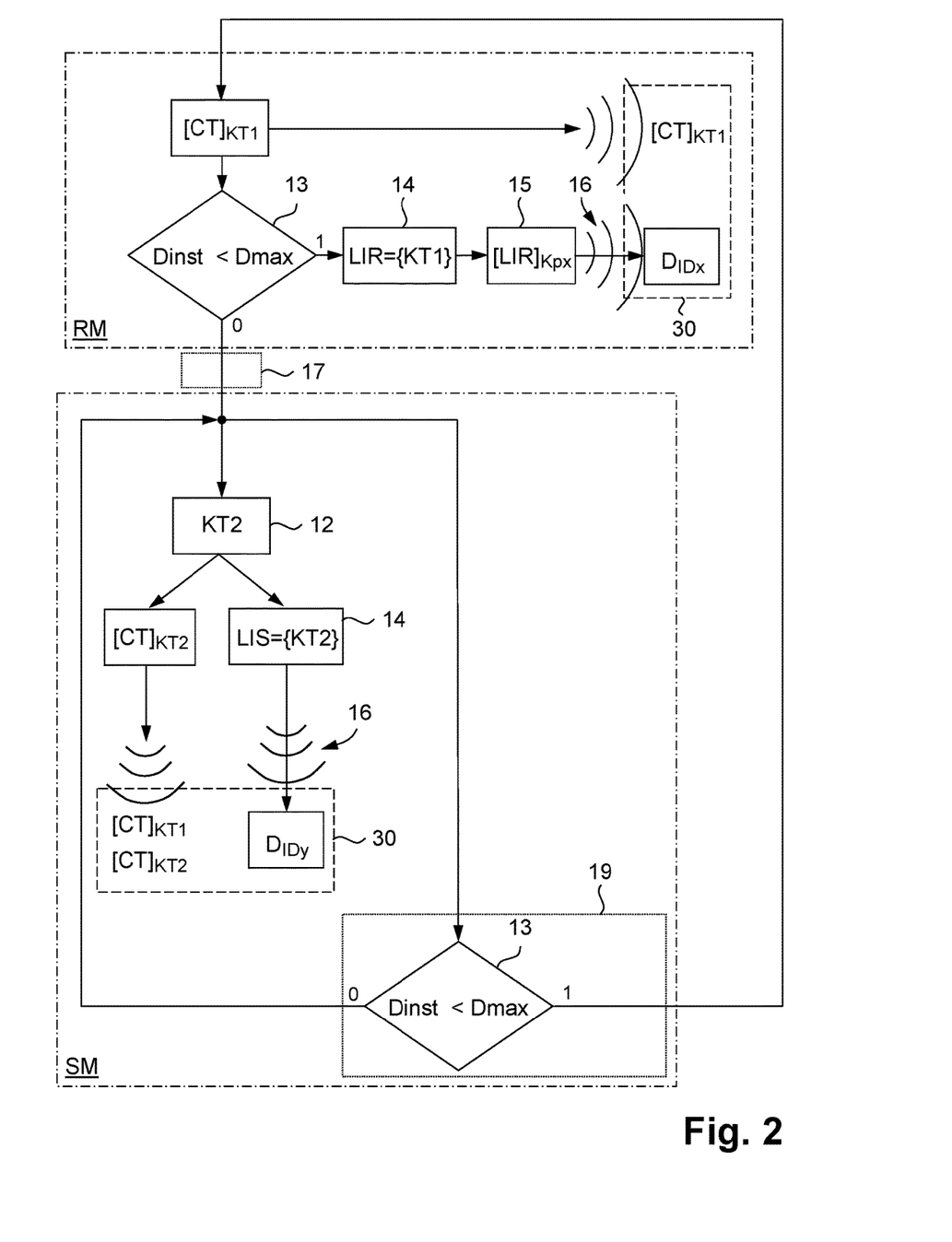
FIG. 2 is an illustration of the main steps of the method of the invention that has been schematized in the form of a flow chart.

The main steps of the method, being the first object of the present invention, are described hereinafter; mainly in reference to the flow chart shown in FIG. 2. The latter is divided into two general zones, each delimited by a dash-and-dot line. The first of these zones corresponds to the steps carried out in the regular mode of distribution (RM) implemented by the server. The second area corresponds to the steps carried out during the singular mode (SM) of distribution, in which the server 10 can switch to meet a peak of requests (requests 33) from user devices 30.

On the top of this flow chart, we can find content CT with protected access by the first protection KT1. This protected content $[CT]_{KT1}$ is transmitted, by means of the transmission means 20, to each user device 30, whose environment is delimited in this figure by a dashed line.

The steps of this method are circular, so that they may be repeated endlessly. The first step aims to verify, by a logic unit 13, if the instantaneous pace (or instantaneous flow) is lower than the maximum pace. In other words, this verifies if the computing resources 11 used by the server at present time T (Dinst) do not exceed a maximal threshold (Dmax). If so, the server is able to answer immediately to all the requests 33 emitted by user devices 30. It therefore generates, by means of a licence generator 14, a regular licence LIR in response to each request. As shown in FIG. 2, the regular licence LIR includes the first protection KT1 that, typically, can be the first transmission key. A protection unit 15 then protects the access to the first protection KT1 by a personal protection Kp that is specific and peculiar to the concerned user device. In FIG. 2, the specific protection associated to the user device $D_{IDx}$ is indicated Kpx. Protected this way in the regular licence LIR, the first protection KT1 is then transmitted through it to the concerned user device $D_{IDx}$ by a transmission unit 16. In order to do this, the regular licence LIR can be incorporated in a control message, for example an EMM according to the DVB standard, or it can be conveyed in another message or by means of equivalent data, according to another standard such as the IPTV standard.

If not so, i.e. if the instantaneous pace is not lower than the maximum pace, the server is in a saturated state. In this state, the totality of its computing resources 11 are used to generate regular licences LIR in response to the requests of the user devices. Accordingly, the server no longer has any availability or resources to calculate further regular licences and will be no longer able to answer immediately to additional requests coming from user devices. For this reason, a selection unit 17 switches the server to a singular mode of distribution (SM), for example by activating a routine that allows to take steps specific to the singular mode of distribution. This distribution mode is singular in the sense that it allows to distribute as many multimedia licences (LIR/LIS) as necessary thanks to a substantial reduction of computing resources required to generate the singular licence and/or thanks to the sharing of a singular licence among several user devices.

In this singular mode, the server will protect access to multimedia content CT by at least one additional second protection KT2 (that is in addition to the first protection). As KT1, this second protection is generated by a security unit 12. According to the preferred embodiment, access to this content will be protected at the same time by KT1 and KT2. However in any case the second protection KT2 is independent of the first protection KT1 so that access to content CT can be guaranteed either by means of the first protection KT1 or the second protection KT2. In a possible embodiment, the content CT could be also encrypted by the second transmission key KT2 but, preferably, the latter is commonly used to encrypt the control word or words CW. In accordance to the DVB standard, the control word or words (CW) will be each encrypted, in an independent way, once by KT1 and once by KT2. We will obtain for example ECM1=$[CW]_{KT1}$ and ECM2=$[CW]_{KT2}$ which can be messages transmitted together, for example in parallel to each other or directly after each other. The different ECMs (or EMMs) can, for example, be identified by the receiver devices by means of the (not encrypted) header of these control messages. As an alternative, we could also consider that ECM1 corresponds to a first part of an ECM message and that ECM2 corresponds to a second part of the same ECM message. This case could be designated by the indication ECM={$[CW]_{KT1}$; $[CW]K_{T2}$}.

The server will also generate, by means of the licence generator 14, at least one licence called singular licence LIS, marked with the reference number 35. This singular licence includes the second protection KT2 and it is represented in FIG. 2 by the indication LIS={KT2}. It will then transmit this singular licence LIS to at least one part of the user devices 30, which due to the lack of computing resources 11 of the server, cannot immediately obtain any regular licence. In FIG. 1, the transmission of this singular licence is represented as coming from an overflow in the funnel that schematizes the processor CPU. As for the regular licence, the transmission of this singular licence can be done by means of a control message, in particular an EMM message, for example a second message EMM2 specifically dedicated to the transport of this licence and which is different from the first message EMM1 containing the regular licence. The transmission of the singular licence LIS can be done according to different methods. In a first method, a point-to-point type (unicast) connection may be used. According to another method, a multipoint broadcast may be used, i.e. to a group of user devices (multicast), while in a last method, a broadcast involving all the user devices (broadcast-type diffusion) may be preferred. As shown in FIG. 2, the user device which could not be given any regular licence LIR receives, in its environment (illustrated by the dashed line), the singular licence as well as the double protected access to content $[CT]_{KT1}$, $[CT]_{KT2}$. Reception of these data is however not limited to user devices that did not receive any regular licence, yet the devices that already have such a regular licence are deliberately omitted from the description of the singular mode of distribution since they are not affected by the reception of a singular licence.

Advantageously, the singular mode of distribution allows to serve a large number of user devices by distributing to them the same singular licence LIS, i.e. an identical licence for all of these devices. Consequently, the server could simply calculate and generate a single singular licence that, momentarily, would be shared by a large number of user devices. This practice allows the server to answer immediately to all the requests 33 despite its limited computing resources. In more sophisticated embodiments, it can be also seen that the singular mode of distribution will further allow to control the distribution of subsequent requests (second requests 33) by staggering them over time. The steps of these more elaborate embodiments are shown in FIG. 2 by the graphical element 19 which can be materialized by a decisional unit. This decisional unit can include the logic unit 13 (as represented in FIG. 2) but could also be placed at the outlet of the logic unit, more precisely on the path to the positive outlet of this logic unit 13.

In the singular mode of distribution, the server will also verify, in a repetitive way, whether the instantaneous pace Dinst is lower than the maximum pace Dmax. This verification can be sequentially carried out with respect to the previous steps or it can be performed preferably in parallel to these steps, as shown in FIG. 2. In case this verification gives a positive outcome, the server will return to its regular mode and will only allow access to multimedia content CT by a regular licence LIR. In this case and according to the preferred embodiment, the server will protect access to the multimedia content CT by the first protection KT1. This case corresponds to a new availability of the server to generate regular licences LIR for new requests 33 and leads to a rate of occupation of its computing resources 11 which redescends below the maximum threshold defined by the value corresponding to the flow Dmax. At this stage, there is no longer any reason to keep the double protection of the access to content by KT1 and KT2 so that multimedia content will have its access again protected by the first protection KT1 only. For practical reasons, this time is however temporized (delayed by a transitional period) in order to avoid any disruption at the receiver devices. After this transitional period, the user devices which do not have any regular licence LIR will no longer be capable to access content CT and will have to immediately send a new request 33 to the server 10 to obtain the first protection KT1 integrated in the regular licence LIR.

In practice, this process takes place very quickly, typically in a shorter time interval than a crypto-period; knowing that a crypto-period represents the time interval during which content can be decrypted by means of the same control word CW. When this control word changes, the user device has to obtain the new control word in advance to decrypt the content which follows, now encrypted by this new control word. If the user device is no longer capable to obtain the control word because the latter is only encrypted by the first protection KT1, then this device will send a request 33 to the server to get access to content. These renewed requests can cause a new peak of requests 33, in particular a peak of second requests 33, received at the server from all user devices that have not yet obtained their regular licence despite having sent a first request. To obviate this problem, this invention also suggests several solutions that will be presented later in the present description.

Different embodiments can be adopted by the server to generate the singular licence or licences during the singular mode of distribution. According to one embodiment, the singular licence LIS is a licence that requires appreciably lower computing resources from the server to be generated if compared to the regular licence LIR. Through this, it becomes possible, in the same time interval, to produce many more singular licences than regular licences. Simplification could be obtained at the level of the algorithm which generates the licences LIS, for example by using a shorter algorithm requiring fewer cryptographic operations. Such a simplified singular licence could therefore still be specific to each user device.

According to another embodiment, the singular licence is a licence shared by a plurality of user devices. In a basic form, this licence could be shared by all the user devices that are waiting to receive a regular licence. Thus, the production of a single singular licence would suffice to serve all the user devices that cannot be immediately assigned a regular licence. In a more elaborate embodiment, the singular licence LIS is a licence which is shared by a particular group of user devices, i.e. by a part of all the user devices waiting to receive their regular licence. Thus, the singular licence could be divided into several singular licences which can be indicated LISa, LISb, LISc, etc. and be respectively generated for groups a, b, c, of user devices. Singular licences LISa, LISb, LISc are all different from each other and each of them includes a second specific protection KT2. As an example, the licence LISa includes a second protection KT2$a$ which is different from KT2$b$ comprised in LISb and KT2$c$ comprised in LISc.

Optionally, access to the second protection KT2 (generic notation including, if appropriate, KT2$a$, KT2$b$, etc.) could also be secured by a common protection Kc known by at least part of the user devices. In order to do this, it would be possible to encrypt KT2 by means of a common protection Kc (shared key) or to encrypt the licence LIS by Kc, or even to encrypt KT2 and LIS by Kc. If the server generates several different singular licences LISa, LISb, LISc, each of them could be protected by a specific and different common protection Kc (Kca, Kcb, Kcc). Advantageously, adding a common protection Kc to secure access to singular licences can raise the security level of the distribution system of licences. The common protection Kc and/or the specific protections Kca, Kcb, Kcc, . . . could be transmitted to the concerned user devices by one or more EMMs.

In a configuration specially applicable to the DVB standard, or to any standard in which the server can send messages to a particular user device $D_{IDx}$ at any time, it is suggested that each request 33 be identified by a specific identifier (R1, R2, R3, etc. as shown in FIG. 1). This request identifier is associated and specific to each user device 30 (for example, respectively $D_{ID1}$, $D_{ID2}$, $D_{ID3}$, etc.) so that it is possible to identify, unambiguously, from which user device each request 33 comes. With this configuration, the server could, in the singular mode of distribution, further carry out the steps of storing the identifier (R1, R2, R3) of each request 33 coming from a user device 30 ($D_{ID1}$, $D_{ID2}$, $D_{ID3}$). Then, if the instantaneous pace Dinst is lower than the maximum pace Dmax, it could generate a regular licence LIR for each request whose identifier has been stored and transmit it to the user device 30 associated to this request identifier. It should be noted that the request identifier (R1, R2, R3) could also be the identifier (ID1, ID2, ID3) associated to each user device. Alternatively, the identifier of each device (ID1, ID2, ID3) having sent a request 33 to the server 10 could be of course stored.

By any of these means, the server could then keep a record containing all the requests for regular licences and know for each of these requests, the identity of the user device which has emitted it or at least the electronic address or the means that allows to reach this device in order to transmit its regular licence to it. The transmission of the latter can be carried out as soon as the computing resources of the server allow. Advantageously, this embodiment keeps regular licences management integrally for the server, so that the user devices do not have to send a second request if they could not be served by the server after their first request. Once a regular licence has been transmitted to the concerned device, the register recording pending requests to be processed can be immediately updated by the server. The latter can thus count at any time the number of regular licences it still has to generate. Preferably, the requests are processed following their order of arrival at the server. However, it could be also possible to associate a priority level to each request and to process them also according to their priority.

In a configuration more specially applicable to the IPTV standard, or to any standard in which the server cannot send messages to a particular user device $D_{IDx}$ at any time, it is suggested that the server further includes counting means CPT of the instantaneous number $N_R$ of regular licences LIR waiting to be generated. Each time a new request arrives at the server, the counting means CPT is incremented by one unit, conversely, it is decremented by one unit when a regular licence has been generated and/or has been transmitted to the concerned device.

In this embodiment, the singular mode of distribution would further comprise the steps aiming at determining whether the instantaneous pace Dinst is lower than the maximum pace Dmax and, if so or preferably as far as Dinst is lower than Dmax, to determine whether said number $N_R$ of regular licences is higher than zero and, as far as $N_R$ is higher than zero, to calculate and broadcast, via an information message addressed to at least part of the user devices, an admission rate $T_A$ representing the ratio of requests acceptable by the server in relation to the number $N_R$ of regular licences totaled by the counting means CPT.

As an academic example, if the instantaneous number of regular licences to be generated is $N_R$=200, the instantaneous pace Dinst=90% of the maximum pace Dmax and the latter can process N=60 LIR per time unit, then the admission rate of the server will be $T_A$=N(Dmax−Dinst)/$N_R$=60 (100%−90%)/200=3%. Thus, the computing resources of the server will allow, at this moment, to treat $N_R$*$T_A$ regular licences, i.e. in this example: 200*3%=6 regular licences among the 200 pending requests.

It will be noted in passing that Dmax−Dinst corresponds to the availability rate of the server or in other words to the available residual pace. Moreover, if Dmax and Dinst paces were directly expressed in number of licences per time unit (in this example it would be: Dmax=N=60; Dinst=N*90%=54), then the admission rate of the server would be $T_A$=(Dmax−Dinst)/NR=(60−54)/200=3%. In all cases, the admission rate $T_A$ is calculated by determining the number $N_D$ of regular licences that computing resources can generate at present time T (considering the instantaneous availability rate of the server), then by determining the quotient of this number $N_D$ of licences that the server can calculate by the number $N_R$ of regular licences totaled by the counting means CPT.

Preferably, the server will switch to the regular mode of distribution as soon as the number $N_R$ of regular licences counted by the counting means CPT is lower than the maximum number of licences that the server can generate per time unit. Thus, if Dmax is expressed in number of licences per time unit (for example, by crypto-period), then the server would be authorized to leave the singular mode of distribution as soon as $N_R$<Dmax. Still preferably, return to the regular mode of distribution is temporized (i.e. delayed) and it will only occur after a transition period that allows the last user devices to acquire their regular licence and to activate it to be able to decrypt the content protected by the first protection. This transition period avoids any disturbance (black screen) at the receiver.

Broadcasting the admission rate $T_A$ via the information message can be done, according to the DVB standard, by means of an ECM-type message which is readable by all user devices (or at least part of the user devices, in particular those which are waiting to receive their regular licence) or, according to an IPTV-type standard, by means of an equivalent message which is broadcast simultaneously with the protected content.

Upon reception of the information message, each user device (or at least each device waiting for a regular licence) can then undertake the following circular steps:
  verifying if it has a singular licence LIS (or conversely if it is waiting to receive a regular licence LIR), if so:
  generating a random number RND, for example between 0 and 1,
  verifying if the generated random number RND is lower than or equal to the admission rate $T_A$, if so, resending the request to the server, if not so, waiting until a new information message is received.

Optionally, it would be possible, before generating the random number, to add a step aimed at verifying if the admission rate $T_A$ transmitted by the information message is well lower than 1. Indeed, if this rate is higher than or equal to 1, the request can be immediately returned to the server because in this case its computing resources can absorb all pending requests.

As an example and with reference to the aforementioned admission rate $T_A$=3%, if the random number RND does not exceed 0.03 (i.e. 3% corresponding to rate TA), then the user device is authorized to return its request to the server. Statistically, the number of devices that will be authorized to return a request to the server will be equal to the number of regular licences the server is able to generate.

Determining and transmitting the admission rate $T_A$ to user devices advantageously allows to regulate the number of second requests sent back by these devices to the server. This allows to communicate to the concerned devices the probability they have to receive a regular licence in response to a second request and, thereby, to avoid a new peak of requests at the server.

Alternatively, other mechanisms may be imagined to control the flow of second requests sent back by user devices that have not yet received their regular licence after their first request. Among these mechanisms, the generation is suggested by the server and during the singular mode of distribution, of a certain number $N_S$ of singular licences (LISa, LISb, LISc, etc.) all of them different from each other. As already mentioned above, each of these singular licences is intended to be transmitted to a distinct part of the user devices and includes a second specific protection (KT2a, KT2b, KT2c, etc.) that, precisely, makes it different from the other singular licences. Nevertheless, each second protection ensures access to multimedia content CT because this access remains protected in an independent way by each protection, regardless of which one it is.

The purpose of generating several different singular licences is to assign each of them to a group comprising a certain number of user devices. This number will approach (preferably, not exceeding) the number of requests the server will be able to process when all the users of this group each send back a second request to the server (almost simultaneously). In order to do this, the number $N_S$ of different singular licences (LISa, LISb, LISc) is determined by the server based on said maximum pace Dmax at which computing resources can determine a regular licence LIR.

Reverting to the values of the previous academic model, at a given time T, the server has to generate for example $N_R$=200 regular licences LIR. Its computing resources only allow it to generate N=60 LIR per time unit according to its maximum pace Dmax. Consequently, the server will create a plurality of singular licences, each of them being assignable to a lot of N user devices. In this case, the number of singular licences LIS the server will create will be equivalent to the full value of $N_R$/N, i.e. in this example 3 singular licences.

Indeed, from moment T, the server is able to create N=60 LIR during a first period P1 extending from moment T to moment T+1. At moment T+1, it will still have to generate $N_R$−N LIR, i.e. 140 regular licences. At each period P, it can generate N=60 LIR according to its maximal flow Dmax. At moment T+2, i.e. at the end of the second period P2, it will still have to generate $N_R$−2N LIR, i.e. 80 regular licences. At the end of the third period P3, it will still remain $N_R$−3N LIR, i.e. 20 regular licences will still have to be generated. During the fourth and last period P4, it will be able to generate the 20 last regular licences. Thus, if the first period is sufficient to generate 60 LIR (Dmax), it will therefore be necessary to generate 3 singular licences LISa, LISb, LISc which will be distributed to the 140 remaining user devices among the 200 waiting to receive a regular licence. Preferably, the first two singular licences LISa, LISb will be each assigned to N=60 user devices according to the maximum pace Dmax. However, a more regular distribution could be also chosen where, according to this example, each singular licence (LISa, LISb, LISc) would be assigned to ($N_R$−N)/3 user devices, i.e. to 46 or 47 user devices. Typically, the period P mentioned here can correspond to a crypto-period.

Every time that a lot of N regular licences has been generated at the end of a period P for a group of user devices to which a certain singular licence had been distributed, the server can remove the second protection KT2 corresponding to this singular licence, i.e. one of the second protections KT2a, KT2b, KT2c, etc. Once this second protection has been removed, the user devices of this group will no longer be able to access the protected content and will thus send a second request to the server to avoid a black screen to be typically shown on the users equipment. As the number of user devices of this group had been controlled by the server, the latter will thus be able to face this influx of second requests and to instantly respond by transmitting the corresponding regular licences. Thus, the singular mode of distribution SM will also comprise, in this embodiment, a step aiming at removing successively each of said specific second protections (KT2) as soon as the corresponding regular licences LIR are generated by the server.

Alternatively, each second protection could allow, by means of a derivation function, to obtain the second protection of lower order (or indice), but it does not allow to obtain the second protection of higher order. For example, having KT2b, KT2a can be obtained by derivation, but KT2c cannot be obtained. Thus, the group of user devices that has the singular licence LISc, which includes KT2c, could access by derivation the content CT, irrespective of whether the content CT is protected by KT2c, KT2b or KT2a. Thus, by choosing the appropriated second protection KT2a, KT2b, KT2c, the server can control the flow of second requests.

For example, if the server chooses to protect access to content CT using KT2a, then all the user devices will be able to have access to this content. Indeed, those having LISa={KT2a} have KT2a directly; those having LISb={KT2b} will be able to obtain KT2a by the derivation function and also those having LISc={KT2c} will be able to obtain KT2a by this function, either directly or by obtaining first KT2b and then KT2a.

If after the following period P the server chooses to protect access to content CT using KT2b, then only the devices having LISb and LISc will be able to decrypt this content. Indeed, the user devices having received LISa={KT2a} will not be able to obtain the second protection KT2b. Therefore, the user devices of the first group (group a) having received a LISa will each send a second request 33 to the server in order to decrypt the content. In the interval, the server will have generated the regular licences LIR of each user of this first group that will each be able to obtain their regular licence in response to their second request. The server will then be able to generate the LIRs of the second group (group b) then, at the next period P, modify the protection of the content so that its access is protected by the second protection KT2c. From that moment, the user devices of the second group (group b) will not be able to access the content using their second protection KTb (the devices of the first group are no longer concerned since they have all received their regular licence). The user devices of the second group will then in turn send a second request to the server to avoid any disturbance (black screen). And so on, it is noted that the server will be able to control, by staggering, the requests 33 (in particular the second requests) coming from the user devices and thus avoid the occurring of peaks of requests that the server cannot absorb.

In a less elaborate variant that will not use a derivation function, it could be envisaged to include several second protections in part of the singular licences so that user devices may obtain directly the second protection appropriate to access content. According to the previous example, we would then have LISa={KT2a}, LISb={KT2a, KT2b} and LISc={KT2a, KT2b, KT2c}.

To cover all the embodiments in which several singular licences LIS are generated to control the flow of second requests, we can mention that the singular mode of distribution SM further comprises a step aiming at selecting successively (from a set of implemented second protections KT2a, KT2b, KT2c, etc.) by which second protection(s) KT2 access to the multimedia content CT has to be protected. From this selection, the server can therefore protect access to content CT by means of a variable set of several independent second protections (KT2a, KT2b, KT2c, etc.) or by means of a single variable second protection KT2 (KT2a or KT2b or KT2c, etc.). This selection is repeated periodically, for example at the end of each period P during which the server was able to generate a lot of N regular licences, until all regular licences LIR have been generated in response to all requests 33 received by the server 10. In other words, this repetition is done until the $N_R$ regular licences waiting to be received (recorded, for example, by the counting means CPT) have been generated.

According to another possible embodiment, the singular mode of distribution SM could be slightly modified so that access to multimedia content CT be no longer protected by a single first protection KT1 but by at least one first protection KT1. Thus, this content could be simultaneously protected by several first protections KT1, all different from each other, for example by KT1, KT1', KT1'', where each first protection would be assigned to a certain group of users. In all cases, each regular licence LIR would comprise at least one of said first protections KT1, KT1', KT1'', the access to which would be, as before, also secured by a specific (or personal) protection Kp.

Advantageously, the present method thus also allows to anticipate the influx of second requests by controlling them by number as well as by the moment they reach the server.

Figure 3A:
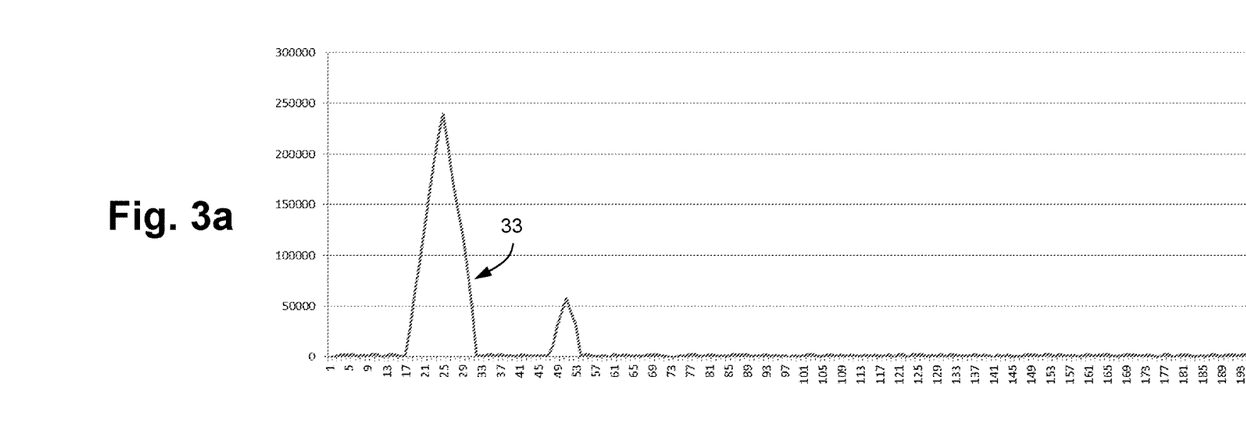
FIG. 3a is an example of graphic representation showing, depending on time, the number of requests received by the server from user devices each requesting to receive a regular licence.

FIG. 3a gives an example of a graphic representation of the number of requests 33 received by the server based on time. This figure shows two peaks of requests, each of which possibly coinciding almost exactly with the beginning of a multimedia event awaited by a large number of users, for example a football match or the broadcast of a film or other event particularly appreciated by the public.

Figure 3B:
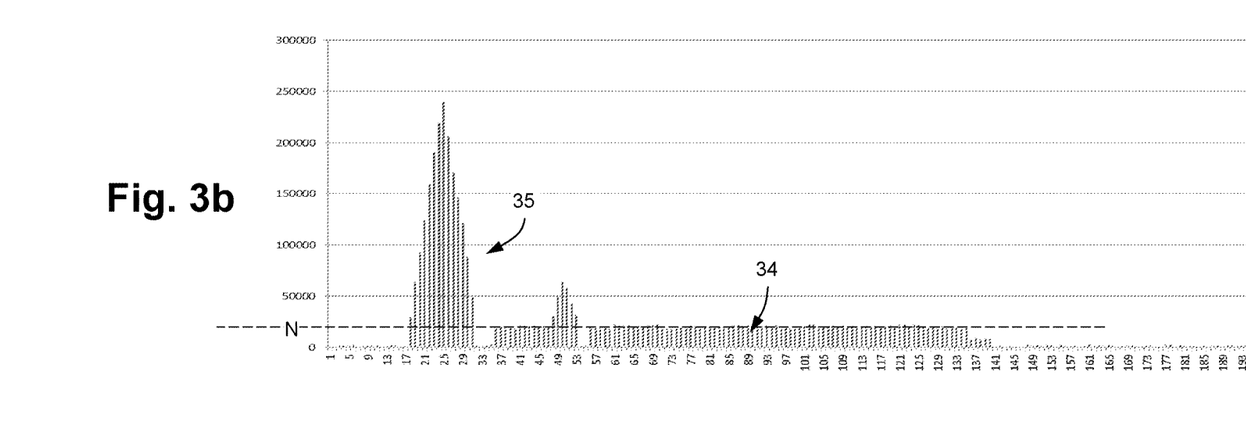

In correspondence with this first graphic, FIG. 3b shows the quantity of regular licences LIR and singular licences LIS which have to be issued by the server to respond to the requests shown in FIG. 3a. In this FIG. 3b, the number N is indicated of regular licences LIR that the server can issue per time unit using all its computing resources 11 to the maximum. This number N thus represents the threshold of regular licences that can be generated per time unit (Dmax). It is represented by a horizontal dashed line placed in ordinate at a height of about 20,000 LIR. Below this threshold, the ratio is shown of regular licences LIR produced by the server to deal with all requests represented in FIG. 3a. Above this threshold, the ratio is shown of requests that will receive a temporary singular licence LIS due to lack of computing resources of the server.

Figure 4A:
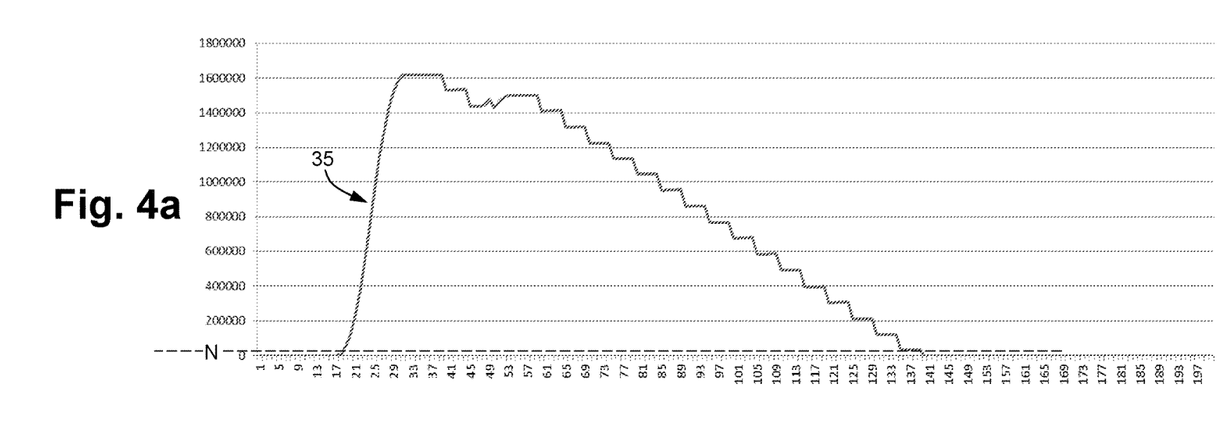
FIG. 4a gives, in correspondence with FIGS. 3a, 3b and according to the same time base, a graphic illustration of the number of singular licences issued by the server.

In correspondence with FIGS. 3a and 3b, FIG. 4a shows, based on the same time base, a graphic illustration of the number of singular licences LIS issued by the server and not yet replaced by regular licences. In FIG. 4a, the threshold of N regular licences that can be produced by the server per time unit is also represented in ordinate by a dashed line. Throughout the time interval where the curve of FIG. 4a is above the threshold N, user devices can use the second protection KT2 to access protected content CT. Outside this time interval, this content can only be accessed by the first protection KT1 found in the regular licence LIR. It should be noted that when the curve of this figure redescends below the threshold N, a transitional period (not shown) still allows to guarantee access to content CT by the singular licence LIS. Temporized return (by this transitional period) to content CT that is only protected by means of the regular licence LIR allows to ensure that all user devices have had time to receive the regular licence LIR and can use it (thus avoiding any temporary disruption of the black screen type at the receivers).

Figure 4B:
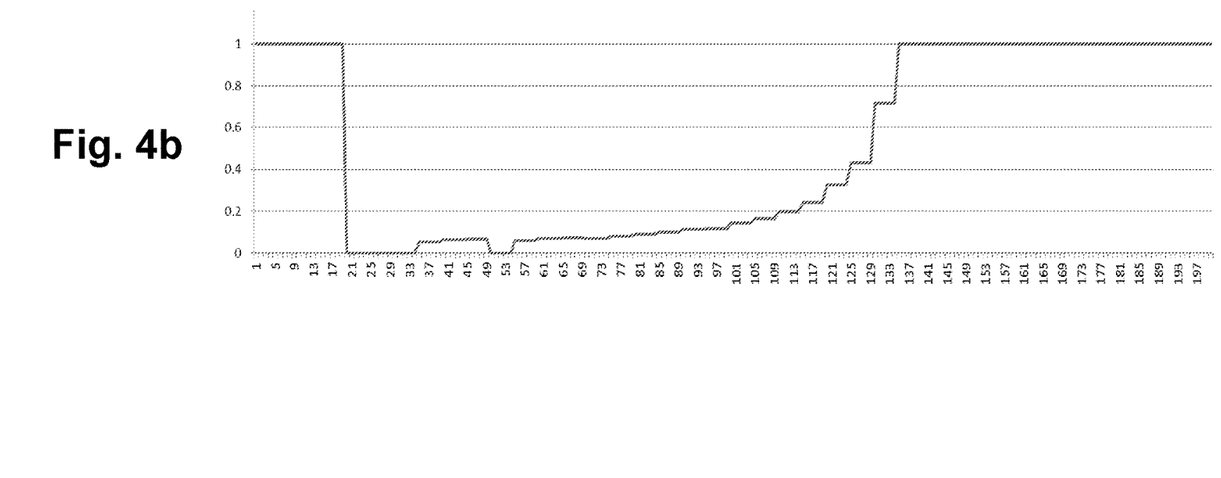

FIG. 4b gives, in correspondence to the graphic of FIG. 4a, the probability that user devices have to obtain a regular licence LIR in response to their request during a time interval encompassing the peaks shown in FIG. 3a. Upon the appearance of the first peak, it is shown in correspondence in FIG. 4b that the server computing resources are very rapidly saturated and, therefore, the probability to obtain a regular licence for most of the requests is zero during the first and the second peak. After the second peak, this probability increases rapidly once most of the user devices have obtained their regular licence.

This invention also relates to a distribution device for the implementation of the method according to any of the variants described above. With reference to FIGS. 1 and 2, this device includes:

computing resources 11 allowing, at an instantaneous pace (Dinst) proportional to the computing resources used and up to the limit of a maximum pace Dmax defined by a maximum use of resources 11 (this pace Dmax can be a value determined by the system hardware or a parametrizable value, for example by an administrator), to generate regular licences LIR in response to requests 33 coming from user devices 30, a security unit 12 to generate said first protection KT1, a logic unit 13 to verify if the instantaneous pace Dinst is lower than the maximum pace Dmax (in order to verify the usage rate of computing resources 11 or, in a complementary way, to verify the availability rate of these resources), a licence generator 14 which, in case of a positive outcome from the logic unit 13, generates, in response to each of the requests 33 (R1, R2, R3, etc.), regular licences LIR (LIR1, LIR2, LIR3, etc.) each of which include the first protection KT1, a protection unit 15 allowing to secure access to the first protection KT1 by a specific protection Kp (Kp1, Kp2, etc.) which is associated to each user device 30 ($D_{ID1}$, $D_{ID2}$, etc.) and that is different for each of the user devices, a transmission unit 16 allowing to transmit, to the user devices 30, the regular licences LIR in response to each of the requests 33, a selection unit 17 that, in case of a negative outcome from the logic unit 13, allows to switch to a singular mode of distribution SM in order to:

protect access to multimedia service CT by at least one additional second protection KT2 (i.e., in addition to the first protection) independent of the first protection KT1, generate by means of the licence generator 14 at least one singular licence LIS comprising the second protection KT2 and transmit, with the aid of the transmission unit 16, the singular licence LIS to at least one part of the user devices 30.

The logic unit 13 is also used, in a repetitive way, in the singular mode of distribution SM to switch to the regular mode RM and to protect access to said multimedia service CT only with the first protection KT1 if the instantaneous pace Dinst is again lower than the maximum pace Dmax. This return to the initial mode can be carried out by the selection unit 17, by activating again the routine implementing the steps of the regular mode of distribution. Preferably, this return to the regular mode of distribution is temporized (and therefore generates a transitional period) to avoid any disturbance at the receiver devices, as already explained above.

The distribution device is preferably integrated into the server 10 of the distribution system by which the multimedia services are made accessible to the user devices. That is why the computing resources 11 referring to server 10, can more particularly be those of the distribution device.

The security unit can typically include a cryptographic key generator. This unit can be used to generate the first protection KT1, the second protection KT2 (or, if appropriate, the second protections KT2a, KT2b, etc.), the specific keys Kp (Kp1, Kp2, etc.) associated to the user devices and, if necessary, the common key or keys Kc which can be used to protect access to the singular licence LIS (if applicable, to the singular licences LISa, LISb, etc.).

The protection unit 15 can be a cryptographic unit capable, by means of an encryption algorithm, a datum to be encrypted and an encryption key, of locking access to this data by encrypting it using the key as a parameter of the algorithm. This protection unit 15 can thus be used to protect access to the first protection KT1 as well as to protect access to the second protection KT2 (or to the second protections KT2a, KT2b, etc.).

If necessary, the instantaneous pace Dinst can be determined by a measuring unit 18 that quantifies the usage rate of computing resources 11.

The distribution device can also include, in a memory, a register to store, at least temporarily, requests or related data it has received and to which it has not been able to respond because of lack of available computing resources. Preferably, such a register will comprise, for each of these requests, a record including an identifier ID to identify the user device 30 emitting the request and/or the electronic address or the means allowing to reach this device. Other fields, such as the personal key Kp associated to each device, a common key Kc shared among a certain number of user devices of the same group, a request identifier, a priority level, a reception moment or a processing delay could also be part of the record.

According to the variants, the distribution device can further comprise: counting means CPT of the instantaneous number $N_R$ of regular licences LIR waiting to be generated, several computing units one of which in particular is to determine an admission rate ($T_A$) representative of the ratio of requests acceptable by the server, a random number generator (RND) as well as a processing unit to process all other useful data for the method of distribution of licences and a central processor to coordinate all the units of the distribution device.

The invention claimed is:

1. A method for distributing multimedia licenses by a server to a plurality of user devices in a distribution system of a multimedia service, the access of which is protected by a first protection according to a regular mode of distribution implemented by the server;

said server being provided with computing resources allowing, at an instantaneous pace proportional to the computing resources used and up to a limit of a maximum pace defined by a maximum use of said resources, to generate regular licenses in response to requests coming from user devices;

each regular license including the first protection, the access of which is secured by a specific protection associated to each user device and different for each user device;

said method comprising:

determining whether said instantaneous pace is lower than the maximum pace and, in response to said instantaneous pace being lower than the maximum pace, generating and then transmitting said regular licenses to the user devices in response to each of said requests;

in response to said instantaneous pace not being lower than the maximum pace, switching the server to a singular mode of distribution adapted to distribute as many multimedia licenses as necessary and comprising:

protecting the access to the multimedia service by at least one second additional protection, independent of said first protection;

generating at the server at least one singular license comprising the second protection; and transmitting the singular license to at least one part of the user devices.

2. The method of claim 1, wherein generation of said singular license requires significantly lower computing resources than said regular license.

3. The method of claim 1, wherein said singular license is a license shared by a plurality of user devices.

4. The method of claim 1, wherein the access to said second protection is secured by a common protection known by at least part of said user devices.

5. The method of claim 1, wherein said specific protection is either a private key, or a public key of a user device in a symmetrical cryptographic scheme, respectively in an asymmetrical cryptographic scheme, between said server and said user device.

6. The method of claim 1, wherein each request is identified by a specific identifier which is associated to each user device, which is different for each user device and which allows the server to send messages to said user device; and wherein said server further carries out the following steps in the singular mode of distribution:

storing the identifier of each request coming from a user device; and in response to the instantaneous pace being lower than the maximum pace, generating a regular license for each request whose identifier has been stored and transmitting the regular license to the user device which is associated to said identifier.

7. The method of claim 1, wherein the regular license is transmitted to the user device within a first entitlement management message, the singular license is transmitted within a second entitlement management message and wherein said multimedia service is a multimedia content encrypted using a control word and wherein, in the regular mode of distribution, said control word is encrypted using said first protection to form a first control message, and in the singular mode of distribution said control word is further encrypted using said second protection to form a second control message.

8. The method of claim 1, wherein said server is further configured to count a number of required regular licenses waiting to be generated; said singular mode of distribution further comprising:

in response to determining that the instantaneous pace is lower than the maximum pace:

to the extent that said number of regular licenses is higher than zero, calculating and broadcasting, via an information message addressed to at least part of the user devices, an admission rate representing the ratio of requests acceptable by the server in relation to the number of regular licenses counted by the server; and upon reception of said information message, performing at each user device the following steps:

verifying if the user device has a regular license; and in response to a verification that the user device does not have a regular license, generating a random number; then verifying if the generated random number is lower than or equal to the admission rate; if so, resending the request to the server; if not, waiting until a new information message is received.

9. The method of claim 8, wherein said admission rate is calculated by determining a number of regular licenses that said computing resources can generate at present time; said admission rate being equal to the quotient of said number, as determined, by the number of required regular licenses counted by the server.

10. The method of claim 1, wherein a certain number of singular licenses different from each other are generated by the server during said singular mode of distribution, each of them being intended to be transmitted to a distinct part of the user devices and includes at least one specific second protection that makes it different from the other singular licenses and that ensures access to the multimedia content; said number of singular licenses being determined by the server based on said maximum pace at which the computing resources can determine a regular license; and wherein said singular mode of distribution further comprises a step aiming to select, among a plurality of second protection, at least one second protection to protect the access to the multimedia content and to periodically repeat said selection until all regular licenses have been generated in response to all requests received by the server.

11. A device for distributing multimedia licenses to a plurality of user devices in a distribution system of a multimedia service, the access of which is protected by a first protection according to a regular mode of distribution, comprising:

computing resources configured to, at an instantaneous pace proportional to the computing resources used and up to the limit of a maximum pace defined by a maximum use of resources, generate regular licenses in response to requests coming from said user devices;

a security unit configured to generate said first protection;

a logic unit configured to verify if the instantaneous pace is lower than the maximum pace;

a license generator configured to, in response to an indication from said logic unit that the instantaneous pace is lower than the maximum pace, generate, in response to each of said requests, regular licenses, each of which includes said first protection;

a cryptographic unit configured to secure access to the first protection using a specific protection associated to each user device and different for each user device;

a transmission unit configured to transmit, to said user devices, the regular licenses in response to each of said requests;

a selection unit configured to, in response to an indication from the logic unit that the instantaneous pace is not lower than the maximum pace, switch to a singular mode of distribution to distribute as many multimedia licenses as necessary and which is configured to:

protect access to multimedia service by at least one additional second protection independent of said first protection;

generate, by means of the license generator, at least one singular license comprising said second protection; and transmit, by means of said transmission unit, said singular license to at least one part of the user devices;

said logic unit being also being configured to switch back to an initial regular mode of distribution by means of the selection unit; and to protect access to said multimedia service using only said first protection, in response to an indication that the instantaneous pace is again lower than the maximum pace.

* * * * *